United States Patent [19]

Leistner et al.

[11] Patent Number: 5,722,131
[45] Date of Patent: Mar. 3, 1998

[54] CLIP FOR FURNITURE SPRINGS, AND METHOD OF MANUFACTURE

[75] Inventors: Volkmar W. Leistner, Toronto; Garry Randall Olson, Scarborough, both of Canada

[73] Assignee: Sigma Tool & Machine, Scarborough, Canada

[21] Appl. No.: 506,558

[22] Filed: Jul. 25, 1995

[51] Int. Cl.$^6$ .................................................. A47C 23/00
[52] U.S. Cl. .................................... 24/703.1; 403/188
[58] Field of Search ........................... 24/703.1; 5/259.1, 5/263, 264.1; 267/99, 110; 403/393, 270, 188; 248/60, 71, 74.3

[56] References Cited

U.S. PATENT DOCUMENTS 2,936,982  5/1960  Cushenberry .
2,982,505  5/1961  Shy .
3,159,708  12/1964  Deal ................................ 403/188 X
3,199,163  8/1965  Surletta ............................ 5/259.1 X
3,422,468  1/1969  Schutz .............................. 5/259.1
4,318,518  3/1982  Davis ................................ 248/60

Primary Examiner—James R. Brittain

[57] ABSTRACT

A furniture clip of the type used with furniture springs, having wire frames, and in which such furniture clips are used for attaching the wire frames to furniture, and having a sheet metal member defining length and width, and formed transversely with a wire receiving recess, and two panels extending at an acute angle relative to one another on either side of the recess, a shield of flexible thermoplastic material extending over the inner surfaces of the two panels, and extending around said wire recess, and edge portions of the thermoplastic defining a width greater than the width of the sheet metal.

11 Claims, 4 Drawing Sheets

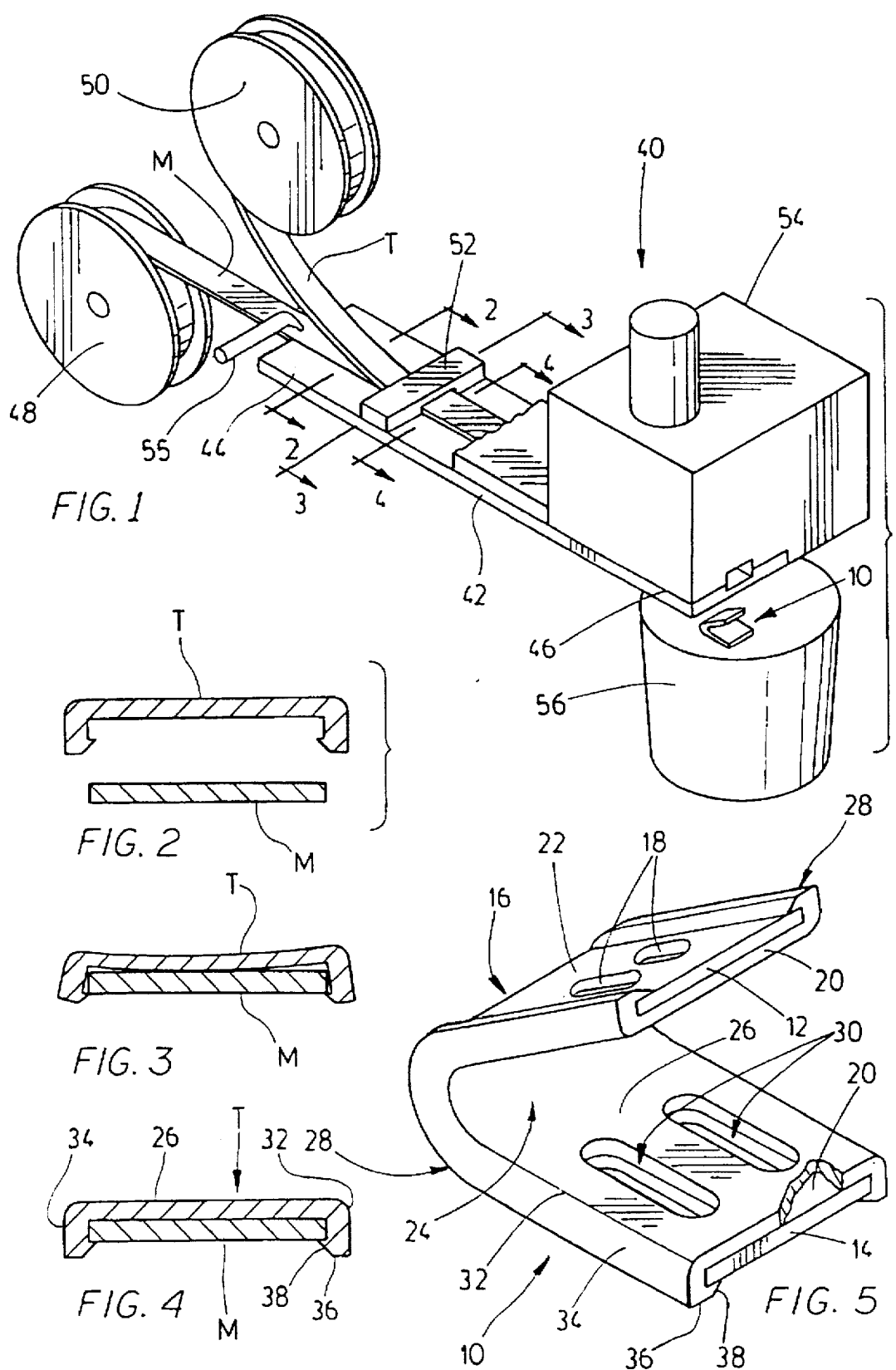

CLIP FOR FURNITURE SPRINGS, AND METHOD OF MANUFACTURE

FIELD OF THE INVENTION

The inventions relates to clips for securing furniture springs, which are resistant to unwanted frictional sounds.

BACKGROUND OF THE INVENTION

The manufacture of furniture, particularly seating, chairs, couches and the like, is usually based on a rigid wooden frame, and a spring assembly supported by the frame.

The edges of the spring assembly are secured to the rigid frame by means of furniture clips.

The same general arrangement is also sometimes used in other furniture such as bedsprings and the like.

One of the problems in such furniture is that when the springs flex consequently the spring wire will tend to flex within the clips securing it to the frame. The wire, where it passes through each clip, presents a metal to metal contact, which is usually under substantial tension. Consequently any relative movement will tend to produce frictional sound of some kind, resulting from the friction between the metals.

This situation has lead the industry to look for solutions to the problem. One process has to use a solid plastic clip. However this is expensive and has insufficient strength.

Another process has been to provide an adhesively bonded paper layer on the inside surface of the clip. This solution is less expensive. However, the clips treated in this way do not solve the problem for any great length of time.

Another process uses plastic film laminated to paper. This is an improvement, but is still not totally satisfactory.

Clearly there exists a need for some form of friction reducing means to be applied to such furniture clips.

In seeking out such a solution to the problem however, it must be recognized that a critical area of friction, which creates the problem, besides the linear contact within the clip, is the area at the two corners or edges of the clip. It is at these two corners or edges that the wire enters, and leaves, the grip of the clip. These are therefore, the areas of the maximum frictional contact, and maximum pressure. Any worthwhile solution therefore, must direct itself at least in part to the problem of limiting the metal to metal contact at these two points.

BRIEF SUMMARY OF THE INVENTION

With a view therefore to providing an improved solution to these problems, the invention comprises a furniture clip of the type used in association with furniture spring assemblies, having wire springs, and in which such furniture clips are used, for attaching such wire springs, said furniture clip comprising, a panel of sheet metal defining length and width, and formed transversely to define a wire receiving recess, and two panel portions extending at an acute angle relative to one another an opposite sides of said wire receiving recess, said panel portion defining inner surfaces of said panel portions facing one another, and outer surfaces of said panel portions on the opposite sides thereof, defining outer surface portions of said panel portions, a shield of thermoplastic material extending over said inner surfaces of said two panel portions, and extending around said wire recess, edge portions of said thermoplastic shield extending along either edge said panel portions, and defining a width greater than the width of said panel portions, and, retaining portions on said thermoplastic shield, said retaining portions extending substantially parallel to but spaced from said edges of said panel portions, and adapted to engage edge portions of said outer surfaces of said metal panel portions, thereby retaining said thermoplastic shield in position.

A further feature of the invention provides wedging surfaces on said retaining clip portions, to facilitate spreading of said retaining portions, for attachment to said metal panels.

A further feature of the invention provides for openings through said panel portions and through said thermoplastic shield.

A further feature of the invention provides a wrap around plastic shield, which is adhesively or chemically bonded to the metal clip.

A further feature of the invention provides a two part construction of the plastic shield, and in some cases provides for bonding of the two parts together around the clip, either adhesively, chemically, or by ultra-sonic welding techniques.

The invention also provides a method of making such furniture clips incorporating a plastic shield.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a perspective illustration of a typical apparatus for manufacturing furniture clips in accordance with this embodiment of the invention;

FIG. 2 is a section along the line 2—2 of FIG. 1;

FIG. 3 is a section along the line 3—3 of FIG. 1;

FIG. 4 is a section along the line 4—4 of FIG. 1;

FIG. 5 is a perspective illustration showing a furniture clip illustrating an embodiment of the invention;

Figure 16A:
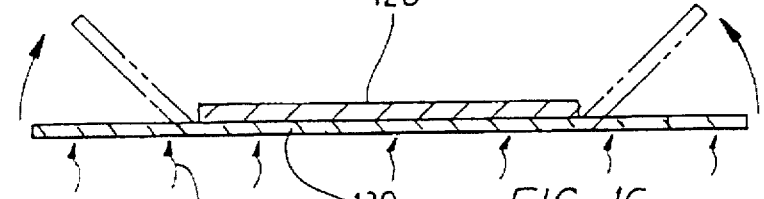
Figure 16B:
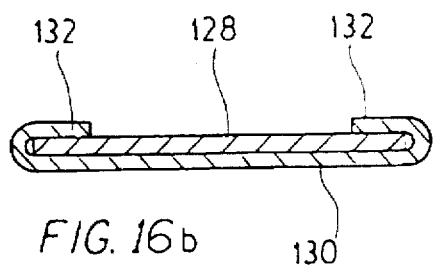
Figure 17:
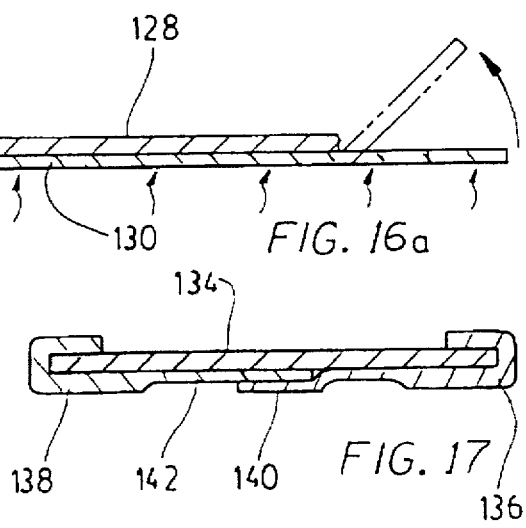
Figure 19:
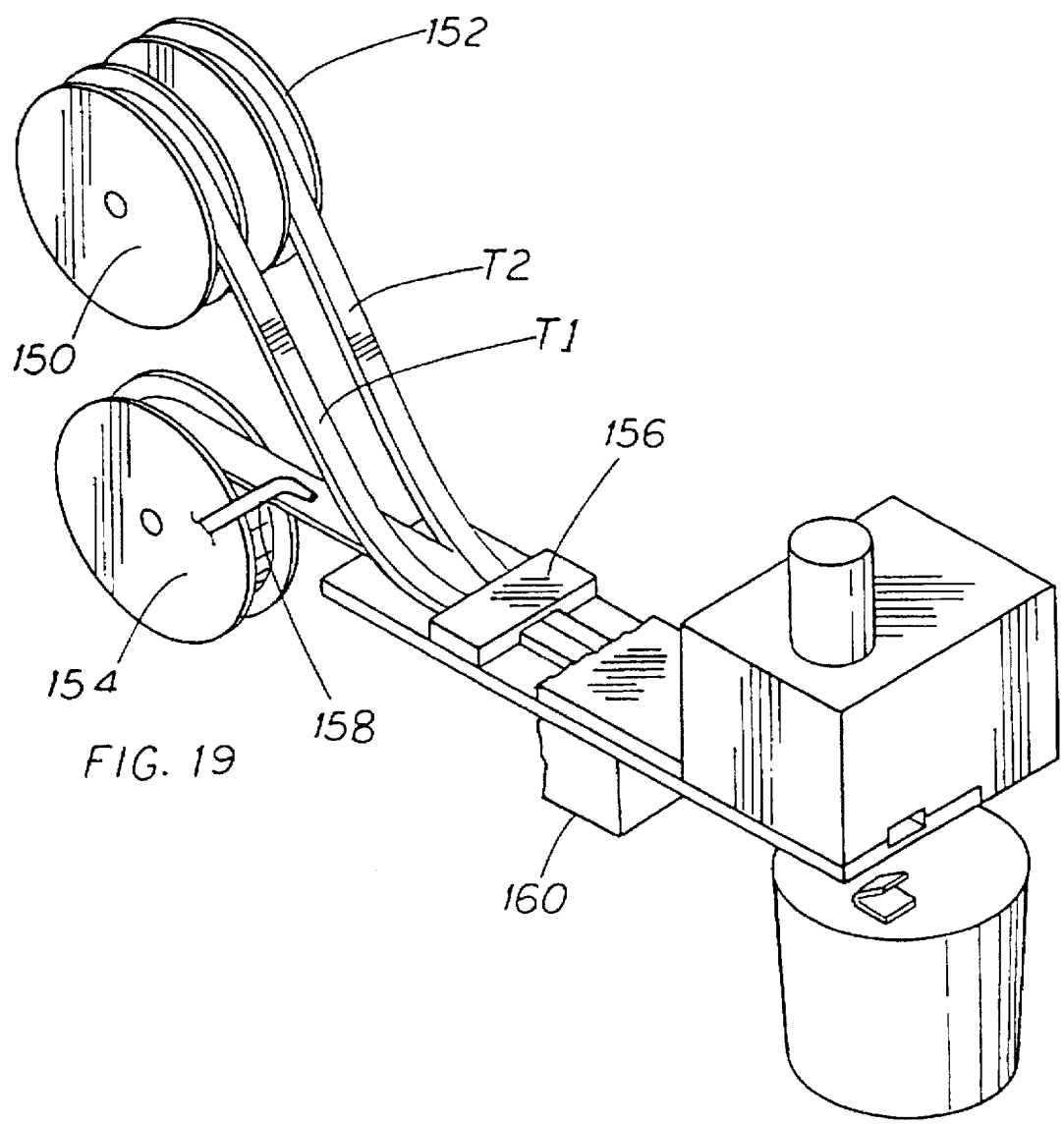
Figure 18:
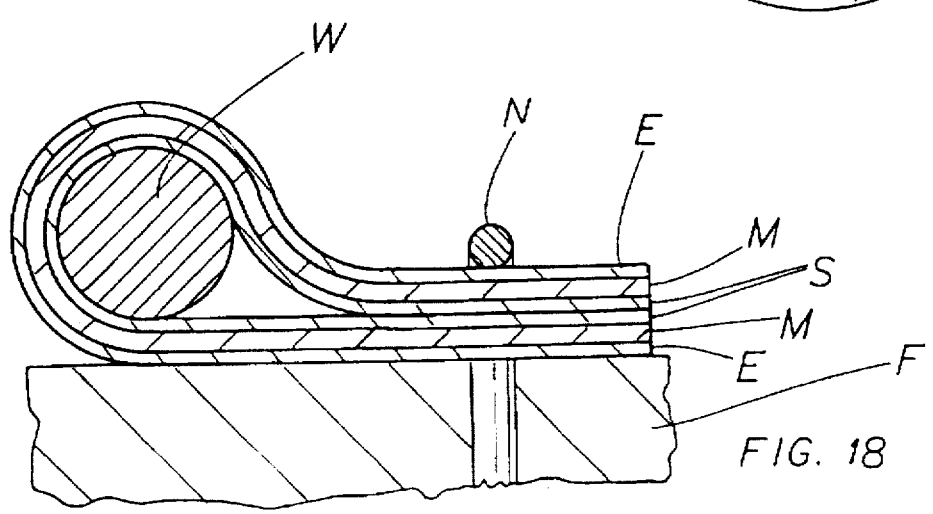

FIGS. 12, 13, 14, and 15, are sections of further embodiments;

FIGS. 16a and 16b are sections of a further embodiment showing two stages in its formation;

FIG. 17 is a section of a further embodiment;

FIG. 18 is a section of a clip installed, corresponding to the clips of FIGS. 12 to 17, and, FIG. 19 is a schematic perspective of the method of manufacture of clips shown in FIGS. 12 to 17.

DESCRIPTION OF A SPECIFIC EMBODIMENT

As explained above, the invention relates to furniture clips of the type which ate used for retaining wire spring assemblies on furniture.

Although not illustrated, it is well known that around the edge of each the wire spring assemblies the furniture clips engage the wire and secure it to the solid frame of the piece of furniture.

As already explained where the wire of the spring assembly contacts the furniture clip, there is a substantial amount of metal to metal friction. When the wire twists within the clip, it will typically create frictional sounds. It is appreciated of course that there are a large number of such furniture clips attaching each wire assembly to the frame, so that there are in fact a large number points within a furniture spring assembly, at which such metal to metal friction will occur.

Referring first of all to FIG. 5, it will be seen that an embodiment of the invention is illustrated there, in the form of composite furniture clip indicated generally as 10. The clips 10 comprises two panels of sheet metal 12 and 14, meeting one another and integrally formed around a curve 16. Openings 18 of elongated shape, arranged in pairs parallel with one another, in respective panel portions 12 and 14, and arranged so the the openings in panel 12 register with the openings in panel 14 are provided for passing fastenings into a frame work or furniture structure. The curved portion 16 of the panels, establishes a recess for engaging and grasping the wire edge frame (not shown) of a typical furniture spring assembly.

In accordance with the invention, it will also be seen that the two panels 12 and 14 define between them an acute angle, and define inwardly facing surfaces 20—20 and outwardly facing surfaces 22—22.

In accordance with the invention, and in order to reduce or restrict the frictional sounds or noise created by movement of the wire spring in the clip, each clip is provided with a thermoplastic shield 24. Each thermoplastic shield in this embodiment will be seen to comprise a central generally planar shield portion 26, and edge formations 28—28 along either side thereof.

Openings 30 of elongated shape arranged in pairs parallel with one another. Openings 30 are formed through the planar portions of the shield portion 26 overlying both panels 12 and 14 so that they register with the openings 18 both panels 12 and 14 of the clip so as to provide clear openings through both the clip and the shield portions.

Each of the edge formations 28 of the thermoplastic shield 24 in this embodiment include generally bevelled corners 32, side edge portions 34, and retaining clip portions 36. The retaining clip portions are adapted to engage the edge surfaces of the metal panels 12, 14 and retain the shield in position. Each of the retaining clip portions 36 is formed with a wedging surface 38, the purposes which will be described below.

It will thus be seen that by this embodiment of the invention, the recess portion of the clip which engages the wire spring (not shown) is completely protected and shielded by thermoplastic. In addition, the edge portions of the recess where the wire frame would enter and exit the recess are buttressed and reinforced with the shielding edge portions 28 of the thermoplastic shield. All of this has the effect of substantially reducing the tendency for friction and friction sounds when there is movement between the spring frame and the furniture clips.

At the same time, the exterior or outwardly facing surfaces of the furniture clip are not themselves shielded. This produces a significant saving in thermoplastic material. In addition, however, as will be explained below by the use of a thermoplastic shield of this shape, having edges, it is possible to make the shield a secure fit on the metal panels at the locations especially on the edges, where the metal to metal pressure, and hence friction, would otherwise be the greatest.

The method of manufacture of such furniture clips will now be described with reference to FIGS. 1, 2, 3, and 4.

As shown schematically in FIG. 1, one form of apparatus on which the clips may be formed is indicated generally as 40.

This apparatus consists of a base plate 42 supported by any suitable means (not shown), and defining a feed end 44 and output end 46. At the feed end 44 there is a strip metal feed unit 48, for feeding strip metal M along the base plate. In addition, there is a thermoplastic feed unit 50, for feeding the thermoplastic shield material T to the base plate 42. A junction station 52 is provided along the base plate 42, for joining the thermoplastic shield material to the sip metal. A stamping and cut-off die unit 54 is provided at the delivery end 46 of the base plate 42 for cutting off and forming the clips. Where adhesive or other bonding is used between the clip and the shield, a dispensing nozzle 55 is provided, being located so as to dispense an adhesive, or a chemical bonding agent, between the metal strip M and the plastic strip T. The nozzle is positioned just upstream of the section line 2—2, where there is adequate space between the two strips.

A bin 56 is located beneath the press to collect finished clips.

FIG. 1 illustrates three sections indicated as 2, 3, and 4, indicating successive stages in the assembly of the thermoplastic shield material with the strip sheet metal.

At the location of FIG. 2, the strip sheet metal is indicated as M and the thermoplastic shield material is indicated as T. At this stage, both materials are essentially continuous strips of such material, being fed separately. The indication of two feed roll units is purely schematic. The material can equally well be fed in linear lengths, in any well known manner.

At this location, the two strips are maintained spaced apart but in vertical registration with one another.

At the joining station 52 (FIG. 3), the two strips M and T are brought together, and pressure is applied to the thermoplastic shield strip forcing it downwardly against the sheet metal strip. In the cases where some kind of adhesive is being used, this pressure will assist in achieving a secure bond.

In the case of the FIG. 2, 3 and 4 embodiment, the pressure has the effect of causing the wedging surfaces 38 to spread apart to wrap around the edges of the sheet metal strip.

Once the two strips exit from the station 52 (FIG. 4), the thermoplastic shield strip is snugly interfitted around the edges of the sheet metal strip as shown in FIG. 4. At the stamping and cutting station 54, an end portion of the two strips is cut off and openings are punched through the two strips simultaneously, and the bend is then formed, forming the finished bent over Clip as shown in FIG. 5.

Figure 6:
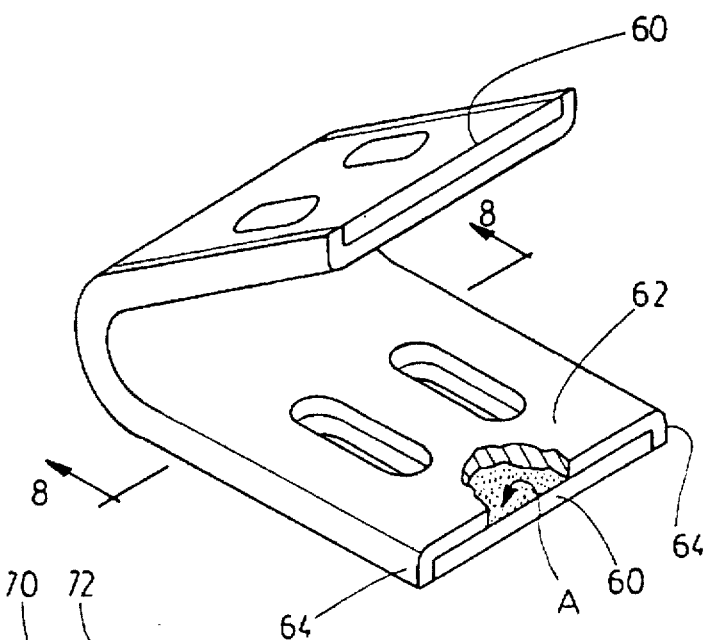
FIG. 6 is a perspective of an alternate embodiment of the invention.

Referring to FIG. 6, an alternate embodiment of the invention is shown which comprises a metal clip 60—60, being formed essentially in the same way as the panels 12 and 14 of FIG. 5.

A generally channel-shaped thermoplastic shield 62 is attached to the inwardly facing surfaces of the clip 60—60. The thermoplastic shield 62 has side wall formations 64—64 which extend around both side edges of the clip 60.

The shield will typically be adhesively or chemically bonded to the metal of the clip as indicated at A in FIG. 6. Such bonding may be used in all embodiments.

Figure 8:
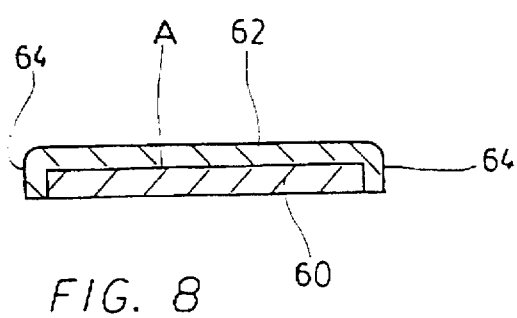
FIG. 8 is a section along the line 8—8 of FIG. 6.

The section of FIG. 8 relates to the FIG. 6 embodiment.

Figure 7:
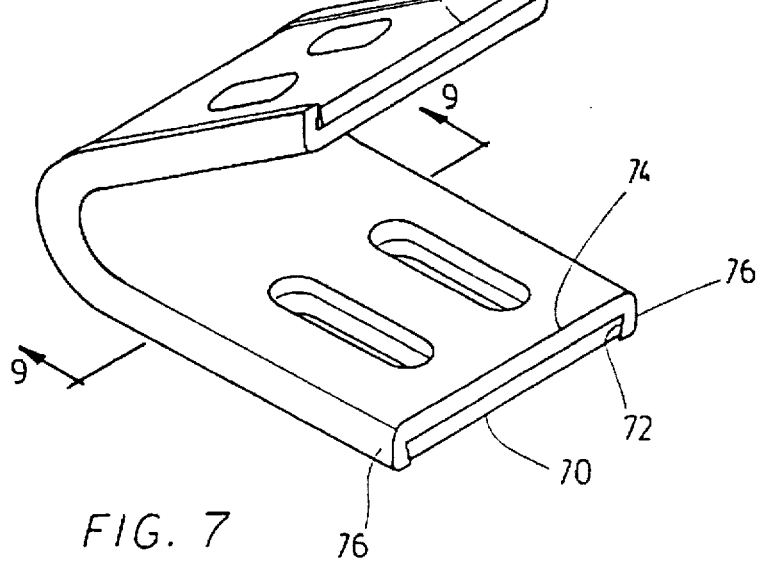
FIG. 7 is a further perspective of a further alternate embodiment of the invention.

A further alternate embodiment of the invention is shown in FIG. 7. In this case a clip 70 having edges 72—72 is provided with a thermoplastic shield 74, positioned over the inwardly facing surfaces of the clip. The shield 74 has inwardly angled generally wedge shaped edge formation 76—76, adapted to snap fit around the edges 72 of the clip 70.

Figure 9:
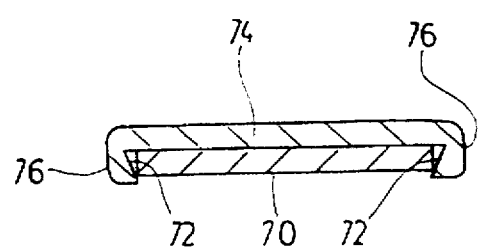
FIG. 9 is a section along the line 9—9 of FIG. 7.

The section of FIG. 9 relates to the embodiment of FIG. 7.

Figure 10:
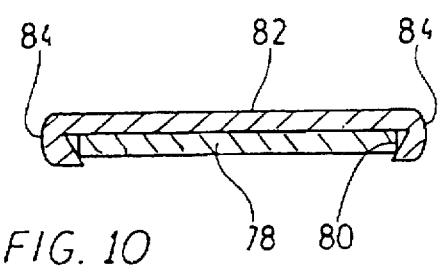
FIG. 10 is a section of a further embodiment.

The further embodiment is shown in section in FIG. 10. In this case the sheet metal strip has a plastic shield 82, with edge formations 84—84. The edge formations 84 are bulged outwardly so as to provide still greater useful life to the plastic shield.

Figure 11:
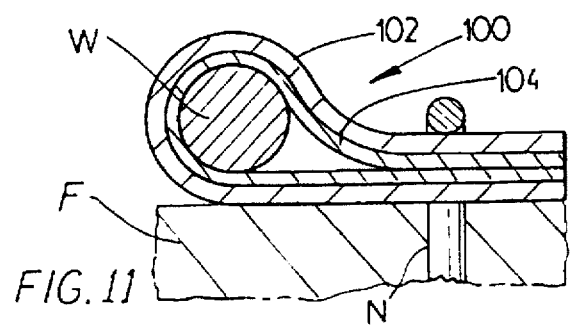
FIG. 11 is a section of a clip shown installed.

FIG. 11 illustrates the use of a furniture clip in accordance with the invention when installed on an article of furniture shown as F.

As previously explained, a wire N of a furniture spring assembly is captured in the furniture clip. The fastener N is then inserted through the openings and driven into the furniture F. In doing so it bends the furniture clip around the wire W into the shape as shown in section.

In FIG. 11, the furniture clip is represented generally as 100, with the metal strip being the outer portion indicated as 102, and the thermoplastic shield being the inner portion and indicated as 104.

Figure 12:
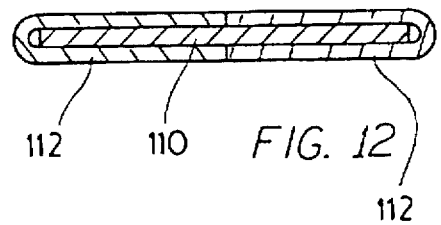
Figure 13:
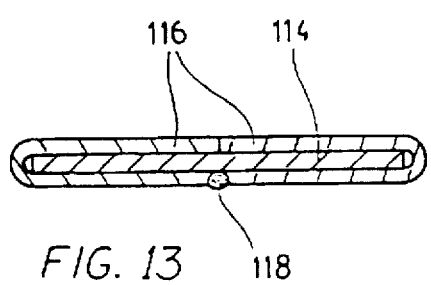
Figure 14:
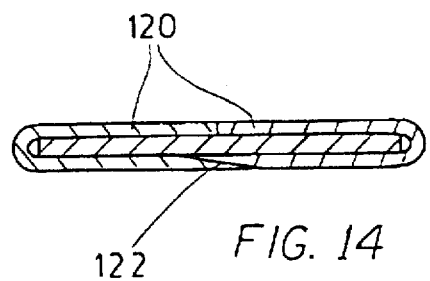

Further embodiments are illustrated in FIGS. 12, 13, and 14.

In FIG. 12 a metal strip 110 is completely encased in a pair of generally U-shaped thermoplastic shields 112—112. Typically the shields would be bonded to the metal strip adhesively or by chemical means.

In FIG. 13 the strip 114 is encased by two U-shaped members 116. In this case, the U-shaped members 116 may be bonded together where they abut at 118, e.g. adhesively, chemically or ultrasonically.

In FIG. 14, the sheet metal member is again encased in two U-shaped members 120. However, on one side at least the members are provided with an angled or scarfed joint 112. This could be joined and bonded by chemical means or by heat and pressure, or ultrasonic welding.

Figure 15:
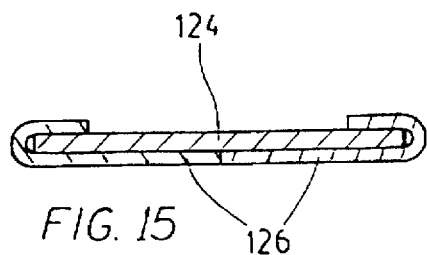

FIG. 15 illustrates a slight modification in that the sheet metal 112 has two thermoplastic shield portions 126 which are of J-shape in section. The two longer J portion extend completely over the one side of the metal strip 124. The shorter portions wrap around the edges and overlap the other side. Typically in this example the two portions would be adhesively bonded to the metal strip.

Still another version is shown in FIGS. 16A and 16B. In this case a metal strip 128 has a thermoplastic shield 130, which is of one piece integral construction. In a multi-stage process, heat would be applied, and the shield 130 would then be bent upwardly and inwardly as at 132—132 to wrap around the reverse side of the metal strip 128. Again, typically there would be some form of adhesive or chemical bonding.

FIG. 17 illustrates a still further embodiment. This is somewhat similar to the embodiment of FIG. 15 in that the sheet metal strip 134 has two generally J-shaped portions 136 and 138 wrapping around the one side of the strip and around the two edges.

However, the thermoplastic members are formed with reduced thickness portions 140 and 142, which would overlap and provide a region for chemical or heat and pressure bonding, or ultrasonic welding.

This version would have certain advantages. It reduces the volume of plastic. It improves the process for punching the openings.

FIG. 18 represents the use of the clip on a piece of wire spring, incorporated in a piece of furniture. In this case, the clip represents any one of FIGS. 12 through 17.

It will be seen that the clip C, comprises a metal strip M, provided with an inner thermal plastic shield S, and around the exterior, the wrap around edges of the shield S are shown as E. A fastening N secures the clip to the furniture F.

The method of manufacturing the clips of FIGS. 12, 13, 14, 15, and 17, is illustrated generally in FIG. 19.

In this case, since there will be two separate strips of thermoplastic strips T, there are two storage rolls 150–152, storing respective thermoplastic strips T1 and T2. They are spaced apart from one another, and would supply the plastic in either elongated U-shaped form or J-shaped form, on opposite sides of the metal strip H, which strip is supplied by roll 154. At the station 156, the two thermoplastic strips T1 and T2 would be squeezed on to the edges of the strip M from either side. Any suitable bonding agent could be supplied from nozzle 158. Alternatively, if ultrasonic welding were used, then the welding could be effected by means such as the ultrasonic welding unit 160.

The embodiment of FIG. 16A and 16B would require a minor modification of the FIG. 1 method so as to apply heat to the thermoplastic strip, and to bend the two side edges as shown in FIG. 16A, such modifications being apparent to those skilled in the art.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A furniture clip of the type used in association with furniture spring assemblies for furniture, having wire springs, and in which such furniture clips are used, for attaching such wire springs to said furniture said furniture clip comprising;

a sheet metal panel defining length and width, and formed transversely to define a wire receiving recess;

two sheet metal panel portions defined by said panel extending at an acute angle relative to one another on either side of said wire receiving recess, said sides of said panel portions adjacent said recess defining inner surfaces of said panel portions, and outer surfaces of said panel portions on the opposite sides thereof;

two pairs of openings of elongated shape formed through respective said sheet metal panel portions, said openings in each said pair being arranged parallel to one another and respective pairs registering with one another with said elongated openings in registration with one another;

a shield of flexible thermoplastic material extending over said inner surface portions of said two panel portions, and extending around said wire receiving recess;

two pairs of openings of elongated shape formed through said shield of thermoplastice material, said openings in each said pair being arranged parallel to one another and said openings in respective pairs registering with respective pairs of openings in respective said sheet metal panel portions;

edge portions of said thermoplastic shield extending along either edge thereof, and defining a width greater than the width of said panel portions, and, retaining means retaining said thermoplastic shield in position on said sheet metal panel.

2. A furniture clip as claimed in claim 1 wherein said retaining means comprise retaining portions extending substantially parallel to one another and adapted to overlay edge portions of said outer surfaces of said metal panel portions.

3. A furniture clip as claimed in claim 2 including wedging surfaces on said retaining portions, to facilitate spreading of said retaining portions, for attachment to said metal panels.

4. A furniture clip as claimed in claim 1 and wherein said retaining means comprises a bonding layer between said shield and said sheet metal panel, bonding the two together.

5. A furniture clip as claimed in claim 4 and wherein said shield is of generally channel-shaped cross-section, and defines a central planar portion overlying the inside surfaces of said sheet metal panel portions, and edge wall portions extending around respective edges of said panel portions.

6. A furniture clip as claimed in claim 1 and wherein said shield defines edge walls, having inwardly angled retaining surfaces adapted to interengage with edge portions of said sheet metal panel portions.

7. A furniture clip of the type used in association with furniture spring assemblies for furniture, having wire springs, and in which such furniture clips are used, for attaching such wire springs to said furniture said furniture clip comprising;

a sheet metal panel defining length and width, and formed transversely to define a wire receiving recess, and two panel portions extending at an acute angle relative to one another on either side of said wire receiving recess, said sides of said panel portions adjacent said recess defining inner surfaces of said panel portions, and outer surfaces of said panel portions on the opposite sides thereof; and, a shield of flexible thermoplastic material extending over said inner surface portions of said two panel portions, and extending around said wire receiving recess, said thermoplastic shield comprising two separate shield portions, said shield portions being fitted around said metal strip, from opposite edges thereof, and said two shield portions each defining at least one side portion adapted to interengage and be bonded to a respective side portion of the other said shield, whereby to secure said shield on said metal strip.

8. A furniture clip as claimed in claim 7 wherein said thermoplastic shield portions are generally elongated U-shaped in section.

9. A furniture clip as claimed in claim 7 wherein said thermoplastic shield portions define at least one bonding edge, said bonding edge being tapered whereby to overlap and interengage with adjacent bonding edge of an adjacent said shield portion.

10. A furniture clip as claimed in claim 7 wherein said shield portions define a generally J-shape in section, with the longer portion of said J-section being adapted to abut against the longer portion of the J-section and an adjacent said shield portion, and the shorter portions of said shield portions being adapted to wrap around the edges of said sheet metal panel.

11. A furniture clip as claimed in claim 10 wherein said longer portions of said J-sections define reduced thickness sections, which are adapted to overlap one another, and to be bonded to one another thereby securing said two portions of thermoplastic shield around said metal strip.

* * * * *